United States Patent
Lee et al.

(10) Patent No.: US 8,385,479 B2
(45) Date of Patent: Feb. 26, 2013

(54) APPARATUS AND METHOD FOR CANCELING INTERFERENCE IN MULTI-ANTENNA SYSTEM

(75) Inventors: Joo-Hyun Lee, Suwon-si (KR); Suk-Seung Hwang, Yongin-si (KR); Jong-Ho Lee, Seoul (KR); Soong-Yoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 957 days.

(21) Appl. No.: 12/315,342

(22) Filed: Dec. 2, 2008

(65) Prior Publication Data

US 2009/0147890 A1 Jun. 11, 2009

(30) Foreign Application Priority Data

Dec. 5, 2007 (KR) .................. 10-2007-0125476

(51) Int. Cl.
*H04L 27/06* (2006.01)

(52) U.S. Cl. ........ 375/341; 375/340; 375/316; 375/219; 375/295; 375/262; 375/264; 455/73; 704/242

(58) Field of Classification Search .................. 375/341, 375/340, 316, 219, 295, 262, 264; 455/73; 704/242

See application file for complete search history.

(56) References Cited

U.S. PATENT DOCUMENTS

| 2004/0066866 A1* | 4/2004 | Tong et al. ..................... 375/347 |
| 2005/0276362 A1* | 12/2005 | Yu et al. ........................ 375/347 |
| 2007/0127589 A1* | 6/2007 | Hwang et al. ................ 375/267 |
| 2007/0155433 A1* | 7/2007 | Ito et al. ..................... 455/562.1 |
| 2008/0293371 A1* | 11/2008 | Kishigami et al. ......... 455/278.1 |

* cited by examiner

*Primary Examiner* — Zewdu Kassa

(57) ABSTRACT

An apparatus and a method for canceling interference based on Maximum Likelihood (ML) at a receiver of a multi-antenna system are provided. The method includes estimating a channel using a signal received over one or more receiver antennas; generating one or more weights using the estimated channel to cancel interference; detecting a candidate symbol having the shortest Euclidean distance through Maximum Likelihood using a first weight; and soft-decoding the candidate symbol using a second weight. Therefore, by receiving the signal based on the ML under the interference, the system capacity can be increased and the reception performance can be enhanced.

20 Claims, 5 Drawing Sheets

APPARATUS AND METHOD FOR CANCELING INTERFERENCE IN MULTI-ANTENNA SYSTEM

PRIORITY

The present application claims the benefit under 35 U.S.C. §119(a) to a Korean patent application filed in the Korean Intellectual Property Office on Dec. 5, 2007 and assigned Serial No. 10-2007-0125476, the entire disclosure of which is hereby incorporated by reference.

TECHNICAL FIELD OF THE INVENTION

The present invention relates generally to an apparatus and a method for canceling interference in a multi-antenna system. More particularly, the present invention relates to an apparatus and a method for canceling interference based on Maximum Likelihood (ML) at a receiver of the multi-antenna system.

BACKGROUND OF THE INVENTION

Rapid growth of the wireless mobile communication market created demands for various multimedia services in a radio environment. For massive transmit data at high data rate using limited resources to provide the multimedia services, researches are conducted on a multi-antenna system, for example, a Multiple-Input Multiple-Output (MIMO) system.

Compared to a single-antenna system, the multi-antenna system can increase a transmission reliability and a data rate by transmitting data over independent channels per antenna, without additional frequency or additional transmit power allocation.

When the multi-antenna system adopts a spatial multiplexing scheme, a transmitter transmits data through a plurality of transmit streams at the same time. In so doing, the transmit streams sent from the transmitter may cause interference and degrade the performance of a receiver.

The receiver of the multi-antenna system mitigates the interference by nulling the interference signals in the channel direction of the stream to detect based on Minimum Mean Squared Error (MMSE).

Disadvantageously, as receiving the signal based on the MMSE, the reception performance of the receiver is degraded further than a receiver based on Maximum Likelihood (ML). In more detail, when receiving signals based on the MMSE, the receiver generates a weight vector for the nulling by treating other signals than the desired signal as the interference. Accordingly, for a plurality of desired signals, the receiver generates the weight vector for the nulling without considering the desired signals and thus the nulling effect is diminished.

Further, the receiver based on the MMSE cannot utilize all of gains in the multi-antenna joint detection, unlike the receiver based on the ML.

When receiving signals based on the ML, the receiver does not consider the interference and thus the interference degrades the reception performance. Herein, the receiver for receiving the signal based on the ML is constructed as shown in FIG. 1.

FIG. 1 is a block diagram of a receiver in multi-antenna system.

The receiver of FIG. 1 includes a plurality of ($N_R$-ary) receive antennas, a front-end processor 101, an ML detector 103, a Log Likelihood Ratio (LLR) generator 105, a decoder 107, and a channel estimator 109.

The front-end processor 101 converts Radio Frequency (RF) signals received via the receive antennas to baseband signals.

The ML detector 103 selects and outputs a symbol having the shortest Euclidean distance using all of candidate symbols applicable to the receive signals output from the front-end processor 101. When selecting the symbol of the shortest Euclidean distance, the ML detector 103 takes into account only its desired signal, not considering interference signals.

The LLR generator 105 generates and outputs a soft decision value (=LLR) of the symbol output from the ML detector 103.

The decoder 107 decodes the LLR value output from the LLR generator 105.

As stated above, the ML based receiver utilizes the separate LLR generator 105 to soft-decode the candidate symbol selected at the ML detector 103. However, since the ML detector 103 selects the candidate symbol without considering the interference signals, the interference signals are recognized as noise and the selected candidate symbol includes the considerable noise. As a result, the LLR generator 105 generates the incorrect LLR value because of the noise in the candidate symbol output from the ML detector, to thus drastically degrade the reception performance.

SUMMARY OF THE INVENTION

To address the above-discussed deficiencies of the prior art, it is a primary aspect of the present invention to address at least the above mentioned problems and/or disadvantages and to provide at least the advantages described below. Accordingly, an aspect of the present invention is to provide an apparatus and a method for canceling interference at a receiver of a multi-antenna system.

Another aspect of the present invention is to provide an apparatus and a method for canceling interference based on Maximum Likelihood (ML) at a receiver of a multi-antenna system.

The above aspects are achieved by providing a method for receiving a signal at a receiver of a multi-antenna system. The method includes estimating a channel using a signal received over one or more receiver antennas; generating one or more weights using the estimated channel to cancel interference; detecting a candidate symbol having the shortest Euclidean distance through Maximum Likelihood using a first weight; and soft-decoding the candidate symbol using a second weight.

According to one aspect of the present invention, an apparatus for a receiver in a multi-antenna system includes one or more receive antennas; a channel estimator for estimating a channel using a signal received via the antennas; a weight generator for generating one or more weights using the estimated channel to cancel interference; a Maximum Likelihood (ML) detector for detecting a candidate symbol having the shortest Euclidean distance through ML using a first weight; and a soft decoder for soft-decoding the candidate symbol using a second weight.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF EXEMPLARY EMBODIMENTS

Figure 1:
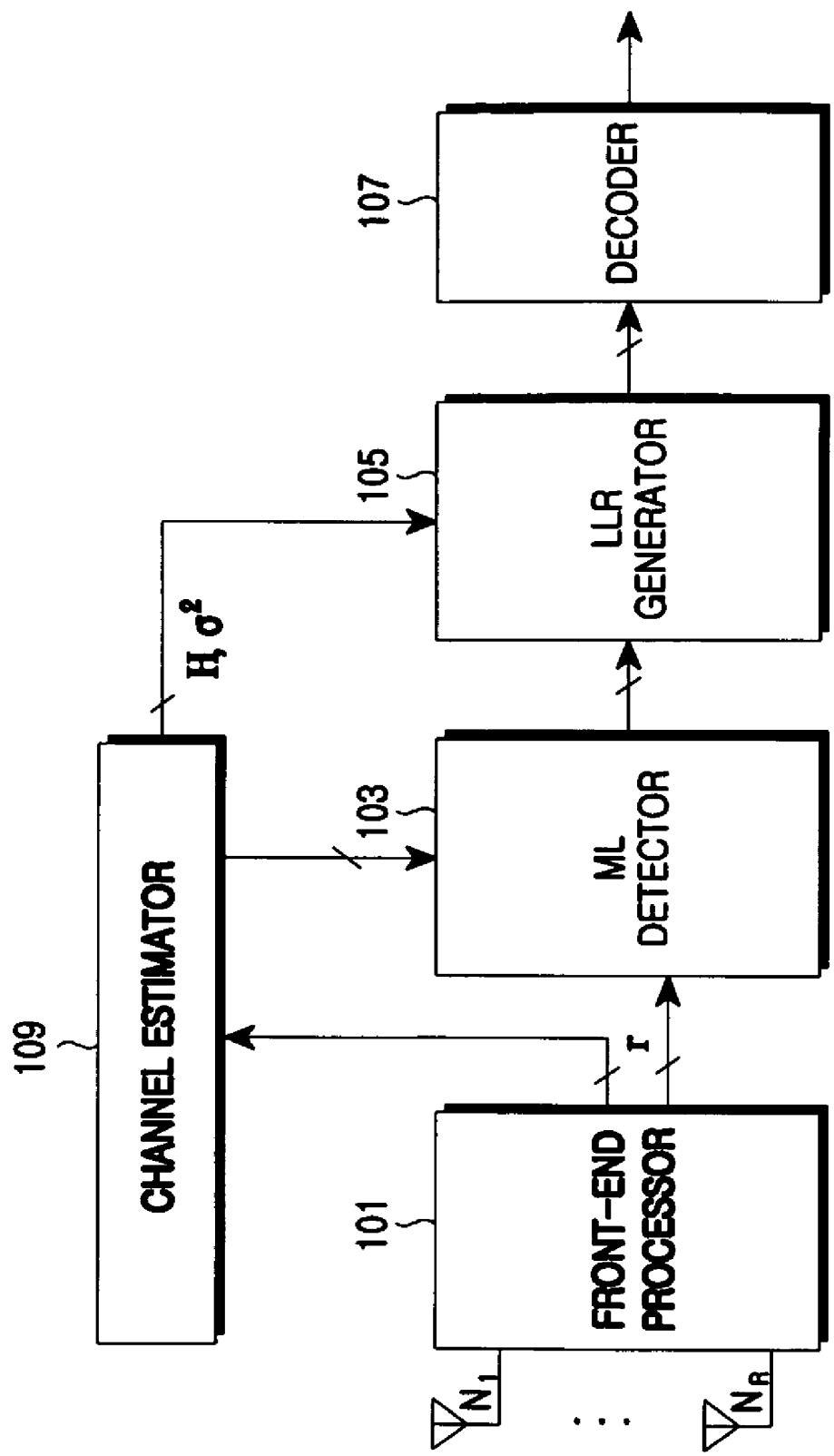
FIG. 1 is a block diagram of a receiver in a multi-antenna system.

FIGS. 2 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide a technique for canceling interference based on Maximum Likelihood (ML) at a receiver of a multi-antenna system. In what follows, it is assumed that the number of multi-antenna streams is $N_S$ with respect to a signal to be received at the receiver amongst signals received from a serving base station (BS), and that the number of interference signals is $N_I$. Herein, $N_S$ is greater than or equal to 1, and smaller than or equal to the number of receive antennas $N_R$ of the receiver ($1 \leq N_S \leq N_R$).

As for interference in the multi-antenna system, the receiver receives signals including its desired signal and an interference signal as expressed in Equation 1:

$$r = Hs + Gi + n \quad \text{[Eqn. 1]}$$
$$= Fx + n.$$

In Equation 1, r denotes a receive signal vector in the size $N_R \times 1$, H denotes a $N_R \times N_S$-sized channel matrix for the signal received from the serving BS, and s denotes a transmit signal vector in the size $N_S \times 1$ transmitted from the serving BS. G denotes a $N_R \times N_I$-sized channel matrix for signals received from neighbor BSs, i denotes an interference signal vector in the size $N_I \times 1$ received from the neighbor BSs, and n denotes a $N_R \times 1$-sized noise vector. F denotes a channel matrix in the size $N_R \times (N_S + N_I)$ including H and G, and x denotes a transmit signal vector in the size $(N_S + N_I) \times 1$ including s and i.

Under the interference as expressed as Equation 1, the receiver receives the signals including the interference signals and the desired signal over the antennas.

To detect the signal based on the ML in consideration of the interference, the receiver needs to select a symbol having the shorted Euclidean distance by taking into account F including the channel matrix to the serving BS and the channel matrix to the neighbor BSs as expressed in Equation 2:

$$\hat{x}_{ideal} = \min_{x} \left\| r - \hat{F} x \right\|^2. \quad \text{[Eqn. 2]}$$

In Equation 2, $\hat{x}_{ideal}$ denotes a symbol selected using the ML detection by considering the channel matrix to the serving BS and the channel matrix to the neighbor BSs; r denotes a receive signal vector; and $\hat{F}$ denotes a channel estimation matrix including a channel estimation matrix of the serving BS and a channel estimation matrix of the neighbor BSs; and x denotes a candidate symbol applied to the ML detection at the receiver.

When $\hat{x}_{ideal}$ is the same as the signal vector transmitted from the serving BS and the neighbor BSs in Equation 2, the minimum Euclidean distance equals the magnitude of the noise vector. Hence, in the ML detection, based on Equation 2, the receiver can generate an optimum LLR.

However, the receiver cannot estimate the channel of the interference signals. Instead, the receiver performs the ML detection based on Equation 3:

$$\hat{s}_{Conv} = \min_{s} \left\| r - \hat{H} s \right\|^2. \quad \text{[Eqn. 3]}$$

In Equation 3, $\hat{s}_{Conv}$ denotes a symbol selected using the ML detection by considering the channel matrix of the serving BS; r denotes a receive signal vector; and $\hat{H}$ denotes a channel matrix estimated using the signal received from the serving BS; and s denotes a candidate symbol applied to the ML detection at the receiver.

In the presence of the interference, when $\hat{s}_{Conv}$ of Equation 3 is the same as the signal vector received from the serving BS, the minimum Euclidean distance is equal to the sum of the magnitudes of the noise vector and the interference signal. That is, when unable to detect the signal based on Equation 3, the receiver cannot generate the optimum LLR using the ML detection based on Equation 3.

To mitigate the interference, the receiver performs the ML detection by applying a weight for the interference cancellation as expressed in Equation 4. Herein, the receiver can generate the weight to mitigate the interference using Zero Forcing (ZF) or Minimum Mean Squared Error (MMSE).

$$\hat{s}_{Prop} = \min_{s}\|W_{HD}(r - \hat{H}s)\|^2 \qquad [\text{Eqn. 4}]$$
$$= \min_{s}\|W_{HD}\{\hat{H}(s_{ML} - s) + \hat{G}i + n\}\|^2.$$

In Equation 4, $\hat{s}_{Prop}$ denotes a symbol selected using the ML detection by applying the interference cancellation; $W_{HD}$ denotes a weight for the ML detection in consideration of the interference cancellation; r denotes a receive signal vector; and $\hat{H}$ denotes a channel matrix estimated using the signal received from the serving BS. $\hat{G}$ denotes a channel matrix estimated using the interference signal; $s_{ML}$ denotes a transmit signal vector received from the serving BS; s denotes a candidate symbol applied to the ML detection at the receiver; i denotes an interference signal vector; and n denotes a noise vector.

As given by Equation 4, the receiver can conduct the ML detection by applying the weight for the nulling on the interference signal. In so doing, the receiver can generate the weight for the interference rejection based on Equation 5. Herein, Equation 5 expresses a weight matrix generated using the MMSE.

$$W_{HD} = \min_{W|s=s_{ML}} E|W\{\hat{H}(s_{ML}-s)+\hat{G}i+n\} - (s_{ML}-s)|^2 \qquad [\text{Eqn. 5}]$$
$$= \min_{W|e=0} E|W(\hat{H}e+\hat{G}i+n) - e|^2$$
$$= H^H(GG^H + \sigma^2 I_{N_R})^{-1}.$$

In Equation 5, $W_{HD}$ denotes a weight for the ML detection in consideration of the interference cancellation; W denotes a candidate weight; and $\hat{H}$ denotes a channel matrix estimated using the signal received from the serving BS. $\hat{G}$ denotes a channel matrix estimated using the interference signal; $s_{ML}$ denotes a transmit signal vector received from the serving BS; s denotes a candidate symbol applied to the ML detection at the receiver; i denotes an interference signal vector; and n denotes a noise vector. $I_{N_R}$ denotes a unitary matrix of the receive antennas of the receiver; e denotes a difference between the transmit signal vector received from the serving BS and the candidate symbol; and $\sigma^2$ denotes a variance of the estimated noise.

When the symbol vector sent from the serving BS matches the candidate symbol vector, the receiver can minimize Mean Squared Error (MSE). Thus, the receiver generates the weight matrix which minimizes the interference signal when the symbol vector $s_{ML}$ sent from the serving BS matches the candidate symbol vector s ($s_{ML}$=s) as expressed in Equation 5.

When able to estimate the channel of the interference signal, the receiver can generate the weight for the interference rejection. The receiver can generate the weight by substituting the channel estimated for its receive signal and the channel estimated for the interference signal to Equation 5.

Conversely, being not able to estimate the channel of the interference signal, the receiver can generate the weight for the interference rejection based on Wiener-Hopf equations, as given by Equation 6:

$$W_{HD,Indirect} = H^H R_I^{-1} \qquad [\text{Eqn. 6}]$$
$$= H^H\left\{\frac{1}{N_P}\sum_{n=1}^{N_P}(r_n - H_n p_n)(r_n - H_n p_n)^H\right\}^{-1}.$$

In Equation 6, $W_{HD,Indirect}$ denotes a weight for the interference rejection when the receiver is not able to estimate the channel of the interference signal; H denotes a channel matrix of the signal to be received at the receiver from the serving BS; $R_I$ denotes a correlation matrix of the receive signal and the interference signal; $r_n$ denotes a n-th receive signal vector; $p_n$ denotes a pilot symbol vector; and $N_P$ denotes an average length to acquire $R_I$. In other words, when generating the correlation matrix of the receive signal and the interference signal, the receiver generates the correlation matrix by averaging $N_P$-ary correlations. Herein, $N_P$ is equal to the number of sequences or pilots required to estimate the channel of the desired signal.

When not able to estimate the channel of the interference signal, the receiver performs the ML detection by substituting the weight matrix generated based on Equation 6 into Equation 4.

To soft-decode the candidate symbol vector selected through the ML detection, the receiver generates a Log Likelihood Ratio (LLR). The LLR is a soft decision value. For instance, when not able to estimate the channel of the interference signal, the receiver generates the LLR using an ML metric by applying the weight for the interference rejection based on Equation 7:

$$\Gamma_{Prop} = \|W_{LLR|s}(r-Hs)\|^2. \qquad [\text{Eqn. 7}]$$

In Equation 7, $\Gamma_{Prop}$ denotes an ML metric for generating the LLR by applying the weight for the interference rejection; $W_{LLR|s}$ denotes a weight for canceling the interference on the candidate symbol when generating the LLR; and r denotes a receive signal vector. H denotes a channel matrix of the signal to be received at the receiver from the serving BS; and s denote a transmit signal vector sent from the serving BS.

As generating the LLR by applying the interference cancellation using the ML metric as expressed in Equation 7, the receiver can generate the weight for generating the LLR in consideration of the interference cancellation based on Equation 8. Herein, Equation 8 expresses the weight matrix generated using the MMSE.

$$W_{LLR|s} = \min_{W|s} E|W\{\hat{H}(s_{ML}-s)+\hat{G}i+n\} - (s_{ML}-s)|^2 \qquad [\text{Eqn. 8}]$$
$$= \min_{W|s} E|W(\hat{H}e+\hat{G}i+n) - e|^2$$
$$= H^H(HH^H + GG^H + \sigma^2 I_{N_R})^{-1} \equiv W_{LLR}.$$

In Equation 8, $W_{LLR}$ denotes a weight for generating the LLR in consideration of the interference cancellation; and $\hat{H}$ denotes a channel matrix estimated using the signal received from the serving BS. $\hat{G}$ denotes a channel matrix estimated using the interference signal; $s_{ML}$ denotes a transmit signal vector received from the serving BS; s denotes a candidate symbol applied to the ML detection at the receiver; and i denotes an interference signal vector. The vector n denotes a noise vector; $I_{N_R}$ denotes a unitary matrix of the receive antennas of the receiver; e denotes a difference between the transmit signal vector received from the serving BS and the candidate symbol; and $\sigma^2$ denotes a variance of the estimated noise.

When generating the LLR based on Equation 7, the receiver needs to take into account not only error in the candidate symbol having the minimum Euclidean distance but also error in other candidate symbols. Hence, the receiver generates the weight matrix to generate the LLR by taking into account every candidate symbol vector s as given by Equation 8.

When able to estimate the channel of the interference signal, the receiver can generate the weight for generating the LLR by substituting the channel estimated for the desired signal and the channel estimated for the interference signal into Equation 8.

Conversely, when not able to estimate the channel of the interference signal, the receiver can generate the weight for the interference cancellation in generating the LLR based on the Wiener-Hopf equations as expressed in Equation 9:

$$W_{LLR,Indirect} = H^H R_I^{-1} \qquad [\text{Eqn. 9}]$$

$$= H^H \left\{ \frac{1}{N_P} \sum_{n=1}^{N_P} r_n (r_n)^H \right\}^{-1}.$$

In Equation 9, $W_{LLR,Indirect}$ denotes a weight applied to generate the LLR when the receiver cannot estimate the channel of the interference signal; H denotes a channel matrix of the signal to be received at the receiver from the serving BS; $R_I$ denotes a correlation matrix of the receive signal and the interference signal; $r_n$ denotes a n-th receive signal vector; and $N_P$ denotes an average length to acquire $R_I$. In other words, when generating the correlation matrix of the receive signal and the interference signal, the receiver generates the correlation matrix by averaging $N_P$-ary correlations. Herein, $N_P$ is equal to the number of sequences or pilots required to estimate the channel of the desired signal to be received from the serving BS.

For the interference cancellation, the receiver can generate the LLR using the ML metric of Equation 7 based on Equation 10:

$$LLR(b_{i,j}) = \log \left[ \frac{\sum_{s|s_i \in C_i^+} \exp(-\|W_{LLR}(r-Hs)\|^2 / \eta^2)}{\sum_{s|s_i \in C_i^-} \exp(-\|W_{LLR}(r-Hs)\|^2 / \eta^2)} \right]$$

$$\cong \frac{1}{\eta^2} \left( \min_{s|s_i \in C_i^-} \|W_{LLR}(r-Hs)\|^2 - \min_{s|s_i \in C_i^+} \|W_{LLR}(r-Hs)\|^2 \right).$$

In Equation 10, $LLR(b_{i,j})$ denotes an LLR of the j-th symbol of the signal received via the i-th receive antenna; $W_{LLR}$ denotes a weight matrix for generating the LLR in consideration of the interference cancellation; and r denotes a receive signal vector. H denotes a channel matrix of the desired signal received at the receiver from the serving BS; and s denotes a transmit signal vector received from the serving BS; and $\eta^2$ denotes an Excess Mean Square Error (EMSE) according to the weight matrix $W_{LLR}$. That is, $\eta^2$ denotes error according to remaining interference and noise not rejected when the interference signal is nulled using the weight matrix. Herein, $\eta^2$ can be given by Equation 11:

$$\eta^2 = \text{trace}\{I_{N_R} - HW_{LLR}\}. \qquad [\text{Eqn. 11}]$$

In Equation 11, $\eta^2$ denotes the EMSE according to the weight matrix $W_{LLR}$; $I_{N_R}$ denotes a unitary matrix in the size $N_R \times N_S$; and trace{ } denotes an absolute square of an diagonal matrix in the braces. Further, $W_{LLR}$ denotes a weight matrix for generating the LLR in consideration of the interference cancellation; and H denotes a channel matrix of the desired signal received at the receiver from the serving BS.

As the receiver nulls the interference signal using the weight matrix, residual interference signal not nulled affects the receiver as the EMSE, as expressed in Equation 11. At this time, provided that the receiver ignores the residual interference signal or treats the residual interference signal as Gaussian noise, $\eta^2$ denotes the value corresponding to the variance of the entire noise including the residual interference signal. Hereafter $\eta^2$ is referred to as an Effective Noise Power (ENP).

When the receiver generates the LLR in consideration of the interference cancellation based on Equation 10 under the interference, the ENP of Equation 11 is generated. In contrast, when the LLR is generated based on Equation 10 under little or less interference, the trace operation in Equation 11 may increase the ENP.

Accordingly, the receiver can generate the LLR based on Equation 10 in the presence of the interference, or based on Equation 12 in the absence of the interference.

$$LLR(b_{i,j}) = \log \left[ \frac{\sum_{s|s_i \in C_i^+} \exp(-\|(r-Hs)\|^2 / 2\sigma^2)}{\sum_{s|s_i \in C_i^-} \exp(-\|(r-Hs)\|^2 / 2\sigma^2)} \right] \qquad [\text{Eqn. 12}]$$

$$\cong \frac{1}{2\sigma^2} \left( \min_{s|s_i \in C_i^-} \|(r-Hs)\|^2 - \min_{s|s_i \in C_i^+} \|(r-Hs)\|^2 \right).$$

In Equation 12, $LLR(b_{i,j})$ denotes an LLR of the j-th symbol of the signal received via the i-th receive antenna; r denotes a receive signal vector; H denotes a channel matrix of the desired signal received at the receiver from the serving BS; and s denotes a transmit signal vector sent from the serving BS. Further, $\sigma^2$ denotes a variance of the estimated noise. For example, $\sigma^2$ can indicate a single noise power estimated frame by frame.

Equation 10 and Equation 12 can be incorporated as Equation 13:

$$LLR(b_{i,j}) = \frac{1}{\upsilon} \left( \min_{s|s_i \in C_i^-} \Gamma - \min_{s|s_i \in C_i^+} \Gamma \right) \qquad [\text{Eqn. 13}]$$

$$(\Gamma, \upsilon) = \begin{cases} (\|r-Hs\|^2, 2\sigma^2) & \text{if } 2\sigma^2 \geq \eta^2 / N_R + \delta_1 \\ (\|W_{LLR}(r-Hs)\|^2, \eta^2) & \text{if } 2\sigma^2 < \eta^2 / N_R + \delta_1 \end{cases}.$$

In Equation 13, $LLR(b_{i,j})$ denotes an LLR of the j-th symbol of the signal received via the i-th receive antenna; $\upsilon$ denotes a coefficient according to the ML metric determined by the presence or absence of the interference; and Γ denotes the ML metric determined by the presence or absence of the interference. $W_{LLR}$ denotes a weight matrix for generating the LLR in consideration of the interference cancellation; r denotes a receive signal vector; H denotes a channel matrix of the desired signal to be received at the receiver from the serving BS, and s denotes a transmit signal vector sent from the serving BS. Further, $\eta^2$ denotes the ENP which is the EMSE according to the weight matrix $W_{LLR}$; $\sigma^2$ denotes the single noise power which is the variance of the estimated noise; $\delta_I$ denotes a calibration constant for the estimation errors of the ENP $\eta^2$ and the single noise power $\sigma^2$; and $N_R$ denotes the number of the receive antennas.

When the single noise power is greater than the ENP equalized by the number of the receive antennas in Equation 13 and the influence of the interference signal is less than that of the noise, the receiver generates the LLR using the general ML metric of Equation 12.

By contrast, under the considerable interference, the receiver generates the LLR using the ML metric considering the interference cancellation based on Equation 10.

Alternatively, when able to estimate a Signal to Interference Ratio (SIR) and a Signal to Noise Ratio (SNR), the receiver can select the ML metric to generate the LLR based on Equation 14:

$$(\Gamma, \upsilon) = \begin{cases} (\|r - Hs\|^2, 2\sigma^2) & \text{if } SIR \geq SNR + \delta_2 \\ (\|W_{LLR}(r - Hs)\|^2, \eta^2) & \text{if } SIR < SNR + \delta_2 \end{cases} \quad [\text{Eqn. 14}]$$

In Equation 14, $\upsilon$ denotes a coefficient according to the ML metric determined by the presence or absence of the interference; Γ denotes the ML metric determined by the presence or absence of the interference; $W_{LLR}$ denotes a weight matrix for generating the LLR in consideration of the interference cancellation; and r denotes a receive signal vector. H denotes a channel matrix of the desired signal to be received at the receiver from the serving BS, and s denotes a transmit signal vector sent from the serving BS. Further, $\eta^2$ denotes the ENP which is the EMSE according to the weight matrix $W_{LLR}$, and $\sigma^2$ denotes the single noise power which is the variance of the estimated noise.

By comparing the SNR with the SIR with respect to the signal received from the serving BS based on Equation 14, the receiver selects the ML metric to generate the LLR. More particularly, when the SNR is less than or equal to the SIR, the receiver generates the LLR using the general ML metric based on Equation 12. When the SNR is greater than the SIR, the receiver generates the LLR using the ML metric considering the interference cancellation based on Equation 10.

Now, the structure of the receiver for the interference cancellation based on the ML is illustrated.

Figure 2:
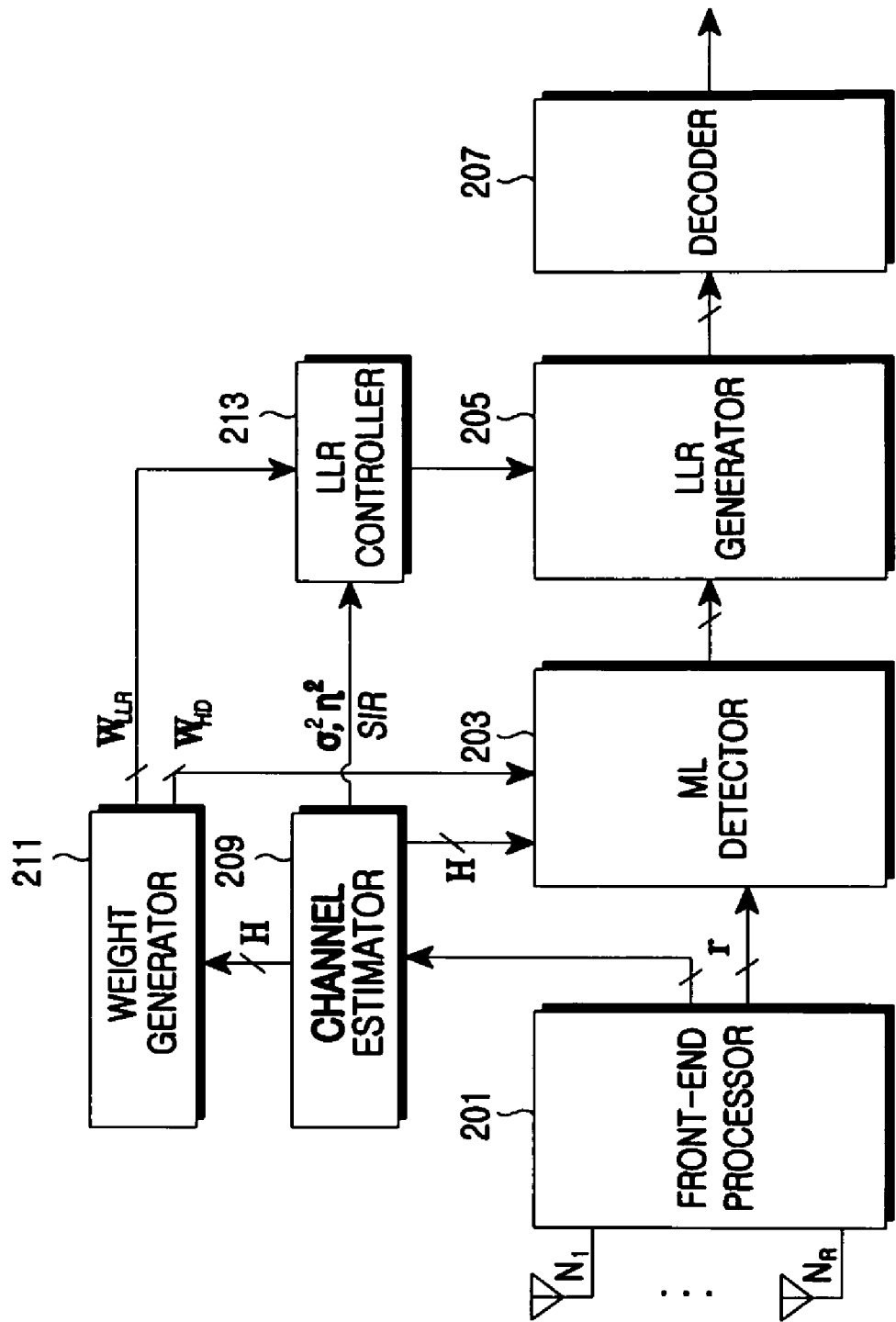
FIG. 2 is a block diagram of a receiver in a multi-antenna system according to an exemplary embodiment of the present invention.

FIG. 2 is a block diagram of the receiver in the multi-antenna system according to an exemplary embodiment of the present invention.

The receiver of FIG. 2 includes a plurality of ($N_R$-ary) receive antennas, a front-end processor 201, an ML detector 203, an LLR generator 205, a decoder 207, a channel estimator 209, a weight generator 211, and an LLR controller 213.

The front-end processor 201 converts Radio Frequency (RF) signals received via the receive antennas to baseband signals. For example, according to Orthogonal Frequency Division Multiplexing (OFDM), the front-end processor 201 includes an RF processor, an Analog-to-Digital Converter (ADC), and an OFDM demodulator. Herein, the RF processor converts the RF signal received over the receive antennas to the baseband signal. The ADC converts the analog signal output from the RF processor to a digital signal. The OFDM demodulator converts the time-domain signal output from the ADC to a frequency-domain signal through Fast Fourier Transform (FFT).

The ML detector 203 generates Euclidean distances by applying the weight fed from the weight generator 211 to all the candidate symbols applicable to the receive signals output from the front-end processor 201. Next, the ML detector 203 selects the symbol having the shortest Euclidean distance. For example, the ML detector 203 conducts the ML detection based on the interference cancellation using the weight matrix output from the weight generator 211 in accordance with Equation 4.

The LLR generator 205 generates and outputs the soft decision value (=LLR) of the candidate symbol selected at the ML detector 203. At this time, the LLR generator 205 selectively uses the ML metric to generate the LLR under the control of the LLR controller 213. For example, under the great interference, the LLR generator 205 generates the LLR using the weight vector provided from the weight generator 211 based on Equation 10 under the control of the LLR controller 213. Under little or less interference, the LLR generator 205 generates the general LLR based on Equation 12 under the control of the LLR controller 213.

The decoder 207 decodes the LLR output from the LLR generator 205.

The channel estimator 209 estimates the channel of the transmitter from the receive signal provided from the front-end processor 201, and transfers the estimated channel to the ML detector 203, the weight generator 211, and the LLR controller 213. If the channel of the interference signal can be estimated, the channel estimator 209 estimates the channel of the interference signal as well.

When the LLR controller 213 selects the ML metric of the LLR generator 205 using the SIR, the channel estimator 209 estimates a Signal to Interference and Noise Ratio (SINR) using the estimated channel information. Next, the channel estimator 209 estimates the SIR using the estimated SINR.

The weight generator 211 generates a first weight for the ML detection of the ML detector 203 based on the interference cancellation, using the channel information provided from the channel estimator 209. For example, the weight generator 211 generates the first weight for the ML detection in consideration of the interference cancellation based on Equation 5. When the channel estimator 209 cannot estimate the channel of the interference signal, the weight generator 211 generates the first weight for the ML detection in consideration of the interference cancellation based on Equation 6.

The weight generator 211 generates a second weight for generating the LLR at the LLR generator 205 based on the interference cancellation. For instance, the weight generator 211 generates the second weight for generating the LLR in consideration of the interference cancellation based on Equation 8. When the channel estimator 209 cannot estimate the channel of the interference signal, the weight generator 211 generates the second weight to generate the LLR by considering the interference cancellation based on Equation 9.

The LLR controller 213 controls the LLR generator 205 by selecting the ML metric to generate the LLR at the LLR generator 205, using the channel information provided from the channel estimator 209. For example, the LLR controller 213 selects the ML metric to generate the LLR according to the influence of the interference determined using the single noise power and the ENP based on Equation 13. The LLR controller 213 selects the ML metric to generate the LLR using the influence of the interference determined using the SIR based on Equation 14.

In this embodiment of the present invention, the receiver can reject the interference based on the ML by generating the first weight to cancel the interference in the ML detection and the second weight to generate the LLR in consideration of the interference cancellation. In so doing, the receiver may carry out the ML detection and the LLR generation by generating only the second weight so as to reduce the complexity in the weight generation.

In this embodiment of the present invention, the receiver generates the first weight and the second weight according to the MMSE.

Alternatively, the receiver may generate the first weight and the second weight according to the ZF. Namely, the receiver generates the first weight to reject the interference in the ML detection using the ZF in accordance with Equation 15:

$$W_{HD,ZF} = \min_{W|s=s_{ML}} E|W\{H(s_{ML}-s)+Gi+n\}|^2 \quad [\text{Eqn. 15}]$$
$$= \min_{W|e=0} E|W(He+Gi+n)-e|^2$$
$$= H^H(HH^H)^{-1}.$$

In Equation 15, $W_{HD,ZF}$ denotes a weight for the ML detection in consideration of the interference cancellation and H denotes a channel matrix of the signal received from the serving BS. G denotes a channel matrix of the interference signal; $s_{ML}$ denotes a transmit signal vector received from the serving BS; s denotes a candidate symbol applied to the ML detection at the receiver; and i denotes an interference signal vector. Further, n denotes a noise vector and e denotes a difference between the transmit signal vector received from the serving BS and the candidate symbol.

The receiver generates the second weight for generating the LLR in consideration of the interference rejection using the ZF in accordance with Equation 16:

$$W_{LLR|s} = \min_{W|s} E|W\{H(s_{ML}-s)+Gi+n\}-(s_{ML}-s)|^2 \quad [\text{Eqn. 16}]$$
$$= \min_{W|e} E|W(He+Gi+n)-e|^2$$
$$= H^H(HH^H)^{-1} \equiv W_{LLR,ZF}.$$

In Equation 16, $W_{LLR,ZF}$ denotes a weight for generating the LLR in consideration of the interference cancellation and H denotes a channel matrix of the signal received from the serving BS. G denotes a channel matrix of the interference signal; $s_{ML}$ denotes a transmit signal vector received from the serving BS; s denotes a candidate symbol applied to the ML detection at the receiver; and i denotes an interference signal vector. Further, n denotes a noise vector and e denotes a difference between the transmit signal vector received from the serving BS and the candidate symbol.

Now, descriptions provide a method for canceling the interference at the receiver using the ML according to an exemplary embodiment of the present invention.

Figure 3:
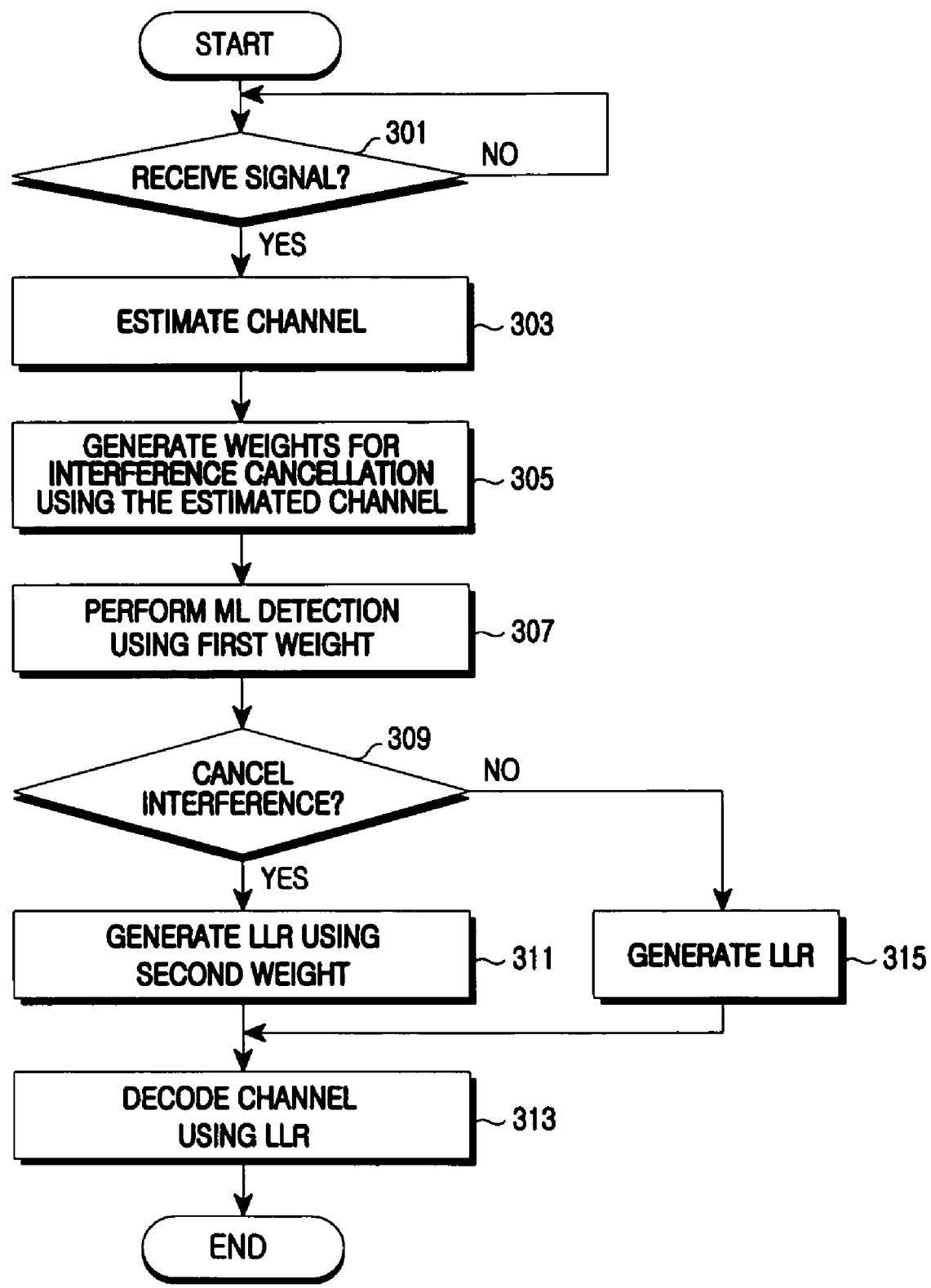
FIG. 3 is a flowchart of a method for canceling interference at the receiver in the multi-antenna system according to an exemplary embodiment of the present invention.

FIG. 3 is a flowchart of the method for canceling interference at the receiver in the multi-antenna system according to an exemplary embodiment of the present invention.

In step 301, the receiver checks whether a signal is received over the plurality of the receive antennas.

When receiving the signal, the receiver estimates the channel to the serving BS using the receive signal in step 303. When able to estimate the channel of the interference signal, the receiver estimates the channel of the interference signal as well.

In step 305, the receiver generates the weights for the interference cancellation using the estimated channel information. For example, the receiver generates the first weight matrix for nullling the interference signal in the ML detection based on Equation 5. When not able to estimate the channel of the interference signal, the receiver generates the first weight matrix for nulling the interference signal in the ML detection based on Equation 6. Also, the receiver generates the second weight matrix for generating the LLR in consideration of the interference cancellation based on Equation 8. When not able to estimate the channel of the interference signal, the receiver generates the second weight matrix for generating the LLR in consideration of the interference cancellation based on Equation 9.

In step 307, the receiver conducts the ML detection in consideration of the interference cancellation using the first weight matrix. For example, the receiver carries out the ML detection considering the interference cancellation by applying the first weight matrix based on Equation 4.

In step 309, the receiver determines whether to generate the LLR in consideration of the interference cancellation using the estimated channel information. For example, the receiver determines the influence of the interference by comparing the single noise power and the ENP based on Equation 13. Alternatively, the receiver determines the influence of the interference according to the SIN based on Equation 14. Upon determining the great influence of the interference, the receiver determines to generate the LLR by taking into account the interference rejection. By contrast, upon determining the little influence of the interference, the receiver determines to generate the LLR by not considering the interference rejection.

As for the little influence of the interference, the receiver generates the LLR without considering the interference rejection in step 315. For example, the receiver generates the LLR in accordance with Equation 12.

By contrast, as for the great influence of the interference, the receiver generates the LLR by considering the interference cancellation using the generated second weight matrix in step 311. For example, the receiver generates the LLR considering the interference cancellation by applying the second weight matrix based on Equation 10.

In step 313, the receiver decodes the LLR.

Next, the receiver finishes this process.

In the following, performance variations when the receiver rejects the interference using the ML are explained.

Figure 4:
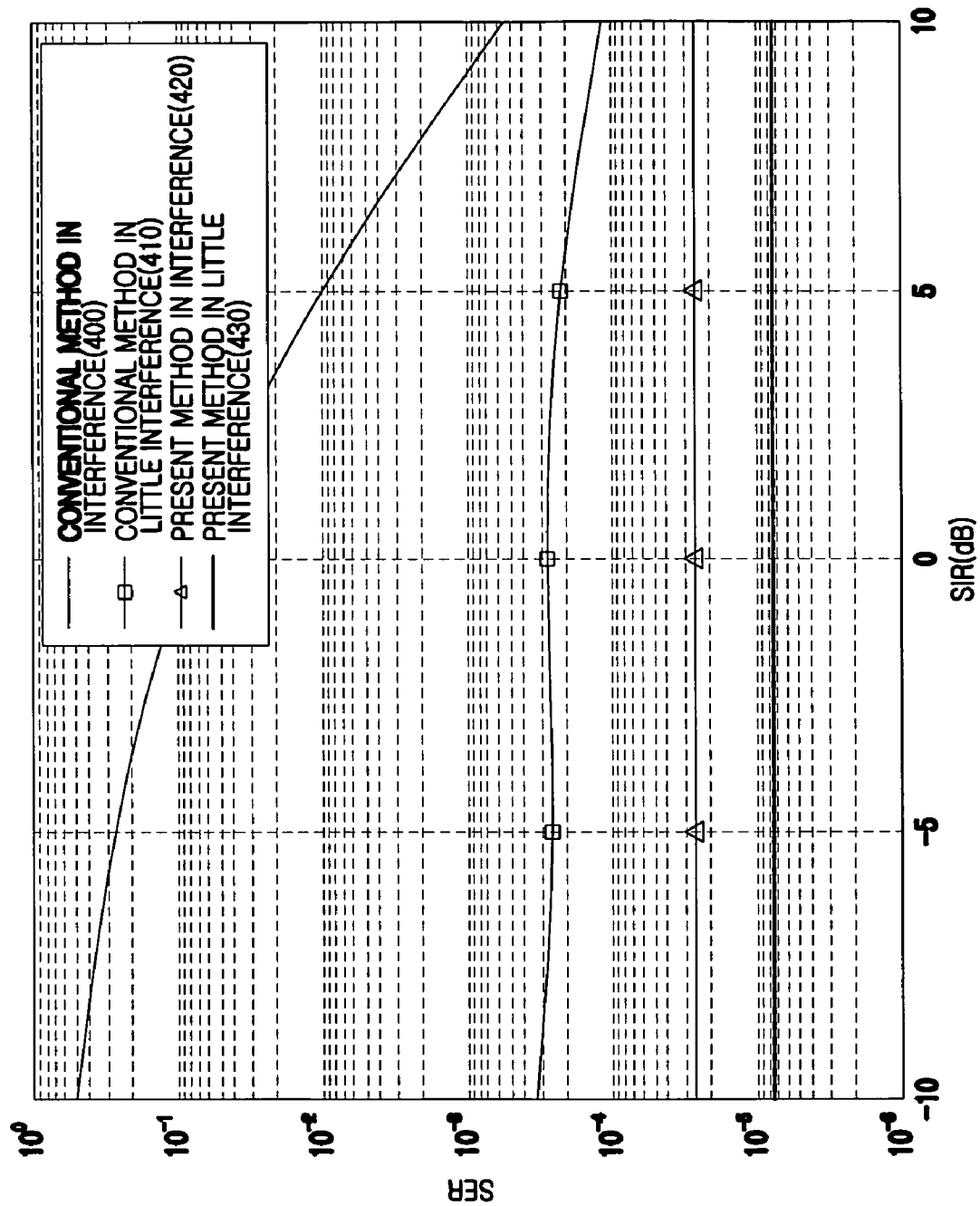
FIG. 4 is a graph showing a performance variation according to an exemplary embodiment of the present invention.

FIG. 4 is a graph showing the performance variation according to an exemplary embodiment of the present invention. The horizontal axis indicates the SIR and the vertical axis indicates a Symbol Error Rate (SER).

Given one desired signal and one interference signal, the SER is measured when the SIR varies from 10 dB to −10 dB to represent the performance of the ML detection in FIG. 4.

The conventional ML detection 400 exhibits the maximum performance when there is no interference. To the contrary, under the interference, the conventional ML detection 410 can not satisfy the SER of $10^{-3}$, which is a reference value for the reception, and thus not receive the signal.

In the presence of the interference, the present ML detection 420 considering the interference cancellation can satisfy the SER below $10^{-3}$ and thus avoid the performance degradation of the receiver. In the absence of the interference, the present ML detection 430 is subject to the performance degradation because of the ENP as expressed Equation 11, compared to the conventional ML detection 400. The receiver can lessen the performance degradation according to the ENP by selectively using the ML metric depending on the influence of the interference based on Equation 13 or Equation 14.

Figure 5:
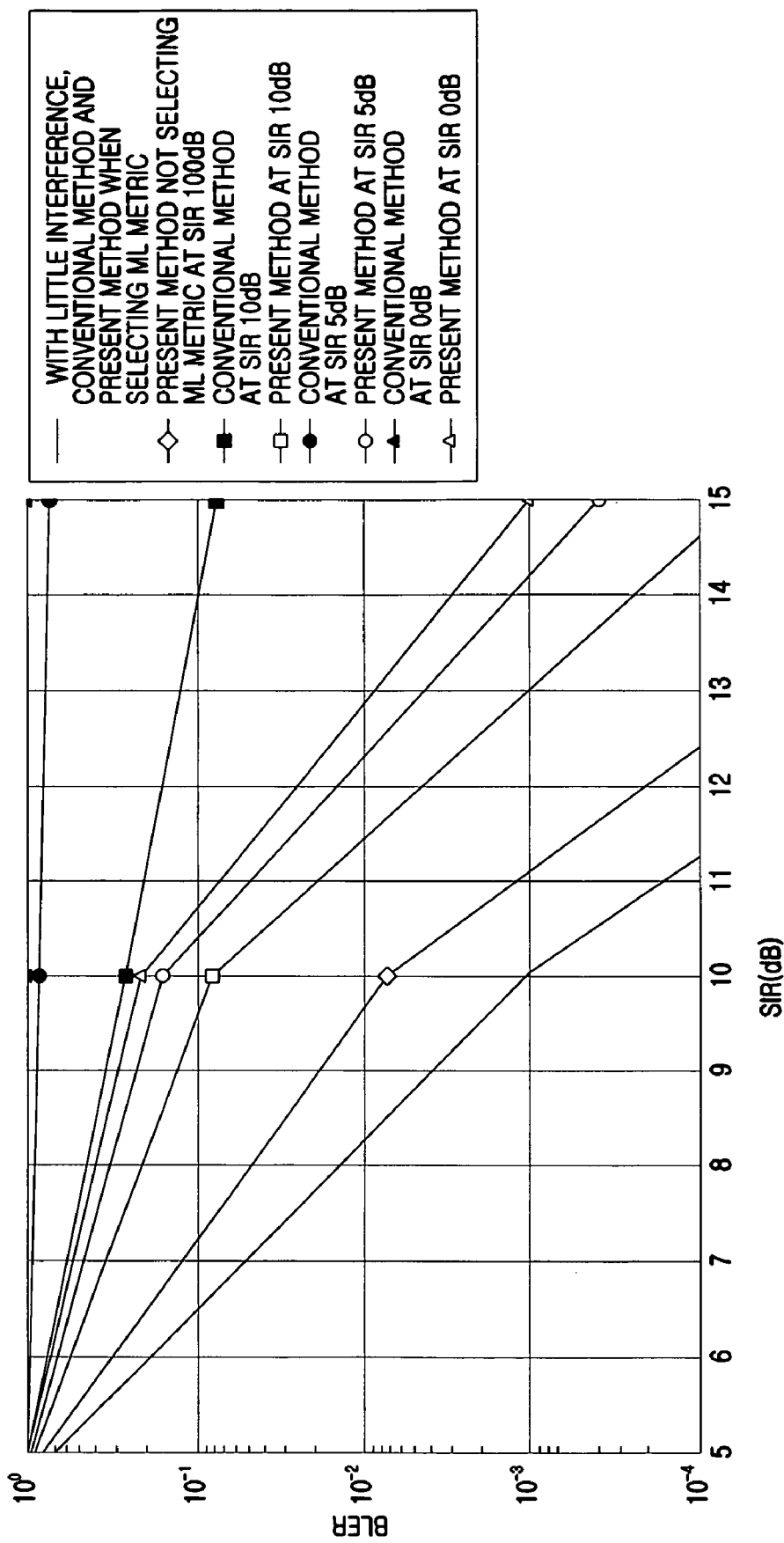
FIG. 5 is a graph showing the performance variation according to another exemplary embodiment of the present invention.

FIG. 5 is a graph showing the performance variation according to another exemplary embodiment of the present invention. The horizontal axis indicates the SNR and the vertical axis indicates a BLock Error Rate (BLER).

Given by two desired signals (2×4 MIMO) and one interference signal, the performance of the soft decoding with the LLR generation adopted is measured in FIG. 4.

As for little interference and the infinite SIR, the first receiver for generating the LLR in the conventional method and the second receiver for generating the LLR by selecting the ML metric according to the present invention exhibit substantially the same performance on account of the same LLR scheme. Herein, the first receiver and the second receiver generate the LLR based on Equation 12.

As the SIR decreases from 10 dB to 0 dB, the first receiver is subject to the worse BLER and cannot receive the signal. By contrast, the second receiver can achieve the BLER below $10^{-2}$ and receive the signal.

In light of the foregoing, the receiver of the multi-antenna system detects the signal based on the ML in consideration of the interference cancellation. Therefore, by receiving the signal based on the ML under the interference, the system capacity can be increased and the reception performance can be enhanced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for receiving a signal at a receiver of a multi-antenna system, the method comprising:
   estimating a channel using a signal received over one or more receiver antennas;
   generating one or more weights using the estimated channel to cancel interference;
   detecting a candidate symbol having the shortest Euclidean distance through Maximum Likelihood using a first weight;
   after detecting the candidate symbol, determining whether to perform soft decoding using a second weight in consideration of interference influence on a reception performance; and
   when determining to perform the soft decoding using the second weight, soft-decoding the candidate symbol using the second weight.

2. The method of claim 1, wherein the first weight and the second weight have different values or the same value.

3. The method of claim 1, wherein, when the candidate symbol detected at the receiver is the same as a symbol transmitted from a serving base station (BS), the first weight is a weight to minimize a Euclidean distance of a channel to the serving BS and a Euclidean distance of a channel of at least one interference signal.

4. The method of claim 1, wherein the second weight is a weight to minimize a Euclidean distance of a channel to a serving BS and a Euclidean distance of a channel of at least one interference signal with respect to all of candidate symbols applicable to the ML at the receiver.

5. The method of claim 1, wherein the generating of the weights comprises:
   when not able to estimate a channel of an interference signal, generating one or more weights for the interference cancellation using the estimated channel and a correlation value of the receive signal and the interference signal.

6. The method of claim 1, wherein the generating of the weights comprises:
   generating one or more weights for the interference cancellation using any one of Zero Forcing (ZF) and Minimum Mean Squared Error (MMSE).

7. The method of claim 1, wherein the detecting of the candidate symbol comprises:
   selecting a candidate symbol having the shortest Euclidean distance calculated by nulling an interference signal using the first weight based on the following equation:

$$\hat{s}_{Prop} = \min_s \left\| W_{HD}(r - \hat{H}s) \right\|^2$$
$$= \min_s \left\| W_{HD}\{\hat{H}(s_{ML} - s) + \hat{G}i + n\} \right\|^2$$

where $\hat{s}_{Prop}$ denotes a symbol selected using ML detection by considering the interference cancellation, $W_{HD}$ denotes the first weight for nulling the interference signal in the ML detection, r denotes a receive signal vector, $\hat{H}$ denotes a channel matrix estimated using the signal received at the receiver from the serving BS, $\hat{G}$ denotes a channel matrix estimated for the interference signal, $s_{ML}$ denotes a signal vector transmitted from the serving BS to the receiver, s denotes one or more candidate symbols applied to the ML detection, i denotes an interference signal vector, and n denotes a noise vector.

8. The method of claim 1, wherein the determining of whether to perform the soft decoding using the second weight comprises:
   comparing a first noise power generated when the soft-decoding is conducted without using the second weight, with a second noise power generated when the soft decoding is conducted using the second weight; and
   determining to perform the soft decoding using the second weight when a great influence of the interference is determined by comparing the first noise power and the second noise power.

9. The method of claim 1, wherein the determining of whether to perform the soft decoding using the second weight comprises:
   determining a Signal to Interference Ratio (SIR); and
   when determining a greater influence of the interference signal based on the SIR, determining to conduct the soft decoding using the second weight.

10. The method of claim 1, further comprising:
    when determining not to use the second weight, soft-decoding the candidate symbol without using the second weight.

11. An apparatus for a receiver in a multi-antenna system, comprising:
    one or more receive antennas;
    a channel estimator configured to estimate a channel using a signal received via the antennas;
    a weight generator configured to generate one or more weights using the estimated channel to cancel interference;

a Maximum Likelihood (ML) detector configured to detect a candidate symbol having the shortest Euclidean distance through ML using a first weight;

a controller configured to determine whether to perform soft decoding using a second weight in consideration of interference influence on a reception performance; and a decoder configured to soft decode the candidate symbol using the second weight in response to a determination to perform the soft decoding using the second weight.

12. The apparatus of claim 11, wherein the weight generator is further configured to generate the first weight and the second weight having the same value or different values.

13. The apparatus of claim 11, wherein, when the candidate symbol detected at the receiver is the same as a symbol transmitted from a serving base station (BS), the weight generator is further configured to generate the first weight which minimizes a Euclidean distance of a channel to the serving base station and a Euclidean distance of a channel of at least one interference signal.

14. The apparatus of claim 11, wherein the weight generator is further configured to generate the second weight which minimizes a Euclidean distance of a channel to a serving base station and a Euclidean distance of a channel of at least one interference signal with respect to all of candidate symbols applicable to the ML at the receiver.

15. The apparatus of claim 11, wherein the weight generator, when not able to estimate a channel of an interference signal, is further configured to generate one or more weights for the interference cancellation using the estimated channel and a correlation value of the receive signal and the interference signal.

16. The apparatus of claim 11, wherein the weight generator is further configured to generate one or more weights for the interference cancellation using any one of Zero Forcing (ZF) and Minimum Mean Squared Error (MMSE).

17. The apparatus of claim 11, wherein the ML detector is further configured to select a candidate symbol having the shortest Euclidean distance calculated by nulling an interference signal using the first weight based on the following equation:

$$\hat{s}_{Prop} = \min_{s} \left\| W_{HD}(r - \hat{H}s) \right\|^2$$
$$= \min_{s} \left\| W_{HD}\{\hat{H}(s_{ML} - s) + \hat{G}i + n\} \right\|^2$$

where $\hat{s}_{Prop}$ denotes a symbol selected using ML detection by considering the interference cancellation, $W_{HD}$ denotes the first weight for nulling the interference signal in the ML detection, r denotes a receive signal vector, $\hat{H}$ denotes a channel matrix estimated for the signal received at the receiver from the serving BS, $\hat{G}$ denotes a channel matrix estimated for the interference signal, $s_{ML}$ denotes a signal vector transmitted from the serving BS to the receiver, s denotes one or more candidate symbols applied to the ML detection, i denotes an interference signal vector, and n denotes a noise vector.

18. The apparatus of claim 11, wherein the controller is further configured to compare a first noise power generated when the soft-decoding is conducted without using the second weight, with a second noise power generated when the soft decoding is conducted using the second weight, and determine to perform the soft decoding using the second weight when determining a great influence of the interference signal.

19. The apparatus of claim 11, wherein the controller is further configured to, when determining a greater influence of the interference signal based on a Signal to Interference Ratio (SIR), determine to conduct the soft decoding using the second weight.

20. The apparatus of claim 11, wherein, when the controller is further configured to determines not to use the second weight, the decoder is further configured to soft-decode the candidate symbol without using the second weight.

* * * * *